(12) United States Patent
Kostyuk

(10) Patent No.: US 12,387,138 B2
(45) Date of Patent: Aug. 12, 2025

(54) META-AGENT FOR REINFORCEMENT LEARNING

(71) Applicant: Braze, Inc., New York, NY (US)

(72) Inventor: Victor Kostyuk, Cambridge, MA (US)

(73) Assignee: Braze, Inc., New York, NY (US)

( * ) Notice: Subject to any disclaimer, the term of this patent is extended or adjusted under 35 U.S.C. 154(b) by 658 days.

(21) Appl. No.: 17/839,567

(22) Filed: Jun. 14, 2022

(65) Prior Publication Data

US 2023/0401482 A1    Dec. 14, 2023

(51) Int. Cl.
*G06N 20/00*     (2019.01)
*G06F 18/21*     (2023.01)
*G06F 18/214*    (2023.01)

(52) U.S. Cl.
CPC ........... *G06N 20/00* (2019.01); *G06F 18/214* (2023.01); *G06F 18/217* (2023.01)

(58) Field of Classification Search
CPC ..... G06F 18/214; G06F 18/217; G06N 20/00; G06N 3/0442; G06N 3/0464; G06N 3/084; G06N 3/092; G06N 5/01; G06N 20/10; G06N 20/20; G06N 7/01
USPC ...... 706/12, 15, 46; 707/692, 730, 734, 769, 707/771, 999.002, 999.009
See application file for complete search history.

(56) References Cited

U.S. PATENT DOCUMENTS

| | | | | |
|---|---|---|---|---|
| 11,645,498 | B2 * | 5/2023 | Baughman | G06N 3/047 706/15 |
| 12,217,137 | B1 * | 2/2025 | Fakoor | G06N 20/00 |
| 12,223,248 | B1 * | 2/2025 | Mitra | G06F 30/27 |
| 2021/0004735 | A1 * | 1/2021 | Chalupka | G06N 20/00 |
| 2021/0319362 | A1 * | 10/2021 | Mguni | G06N 20/00 |

FOREIGN PATENT DOCUMENTS

| | | | | | |
|---|---|---|---|---|---|
| CN | 110850861 A | * | 2/2020 | | G06N 3/006 |
| EP | 3745323 A1 | * | 12/2020 | | G06N 20/00 |
| EP | 3828779 A1 | * | 6/2021 | | G06N 3/045 |
| EP | 3835895 B1 | * | 2/2025 | | G05B 15/02 |
| WO | WO 2019183195 A1 | * | 9/2019 | | G06Q 10/063 |

OTHER PUBLICATIONS

Reinforcement Learning, Wikipedia, Updated May 26, 2022, https://en.wikipedia.org/wiki/Reinforcement_learning, 16 pp.

* cited by examiner

*Primary Examiner* — Md I Uddin
(74) *Attorney, Agent, or Firm* — FisherBroyles, LLP

(57) ABSTRACT

A computing machine receives a request for an action by a meta-agent at the computing machine. The computing machine selects, using the meta-agent, an agent for determining an action responsive to the request. The agent is selected from a plurality of reinforcement learning agents. The agent is selected based on values in a dataset associated with the request. At least a portion of the dataset has predefined value types. The meta-agent and each agent from the plurality of reinforcement learning agents is trained using datasets including the predefined value types. The computing machine transmits, to the selected agent, the request for the action to cause the agent to compute the action.

14 Claims, 10 Drawing Sheets

META-AGENT FOR REINFORCEMENT LEARNING

TECHNICAL FIELD

Embodiments pertain to computer architecture. Some embodiments relate to artificial intelligence. Some embodiments relate to a meta-agent for reinforcement learning.

BACKGROUND

Multiple reinforcement learning agents may be available to solve a problem. Techniques for selecting, from among the multiple reinforcement learning agents, an agent to solve the problem may be desirable.

DETAILED DESCRIPTION

Figure 1:
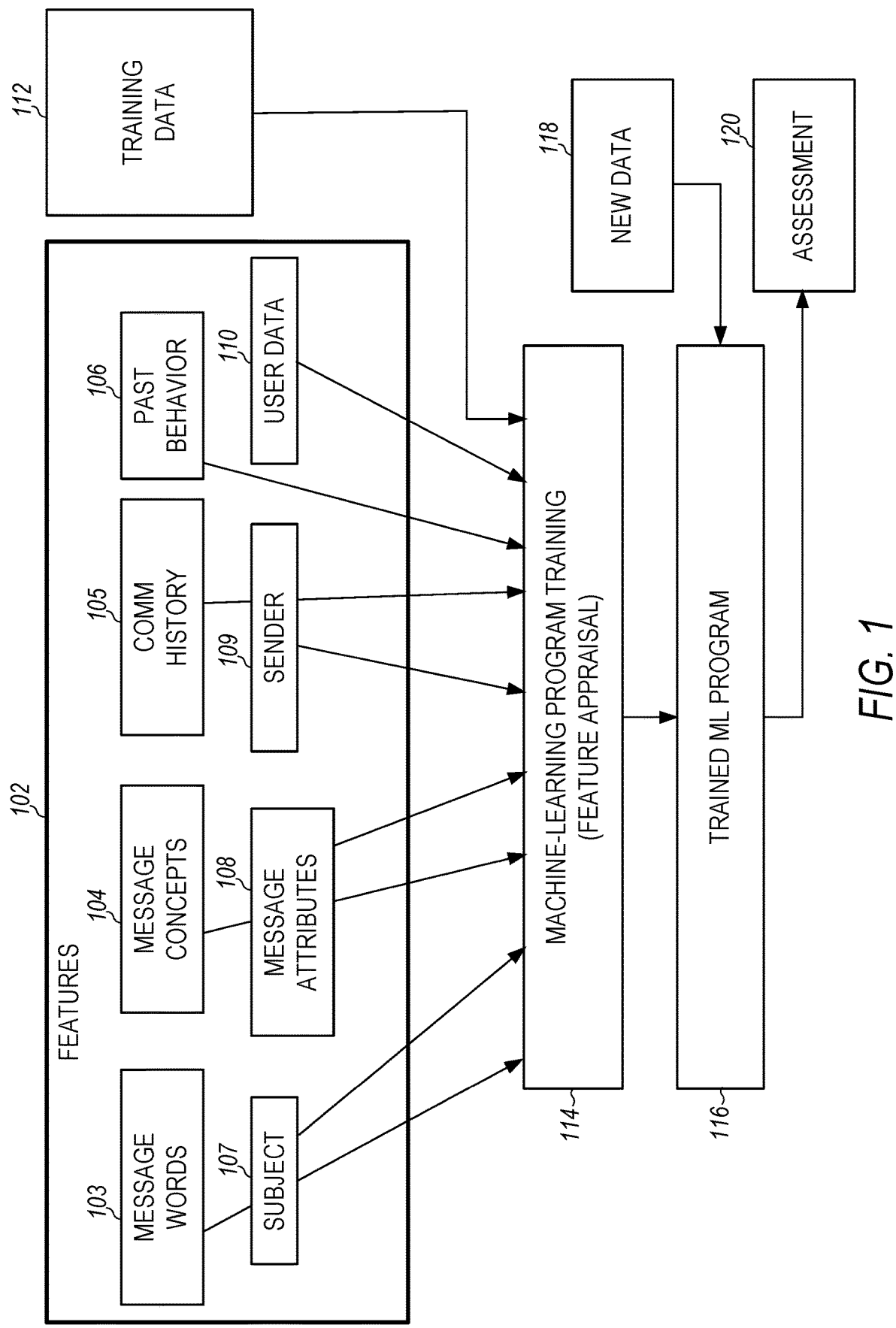
FIG. 1 illustrates the training and use of a machine-learning program, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Aspects of the present technology may be implemented as part of a computer system. The computer system may be one physical machine, or may be distributed among multiple physical machines, such as by role or function, or by process thread in the case of a cloud computing distributed model. In various embodiments, aspects of the technology may be configured to run in virtual machines that in turn are executed on one or more physical machines. It will be understood by persons of skill in the art that features of the technology may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software, the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As used herein, the term "model" encompasses its plain and ordinary meaning. A model may include, among other things, one or more engines which receive an input and compute an output based on the input. The output may be a classification. For example, an image file may be classified as depicting a cat or not depicting a cat. Alternatively, the image file may be assigned a numeric score indicating a likelihood whether the image file depicts the cat, and image files with a score exceeding a threshold (e.g., 0.9 or 0.95) may be determined to depict the cat.

This document may reference a specific number of things (e.g., "six mobile devices"). Unless explicitly set forth otherwise, the numbers provided are examples only and may be replaced with any positive integer, integer or real number, as would make sense for a given situation. For example, "six mobile devices" may, in alternative embodiments, include any positive integer number of mobile devices. Unless otherwise mentioned, an object referred to in singular form (e.g., "a computer" or "the computer") may include one or multiple objects (e.g., "the computer" may refer to one or multiple computers).

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

Figure 2:
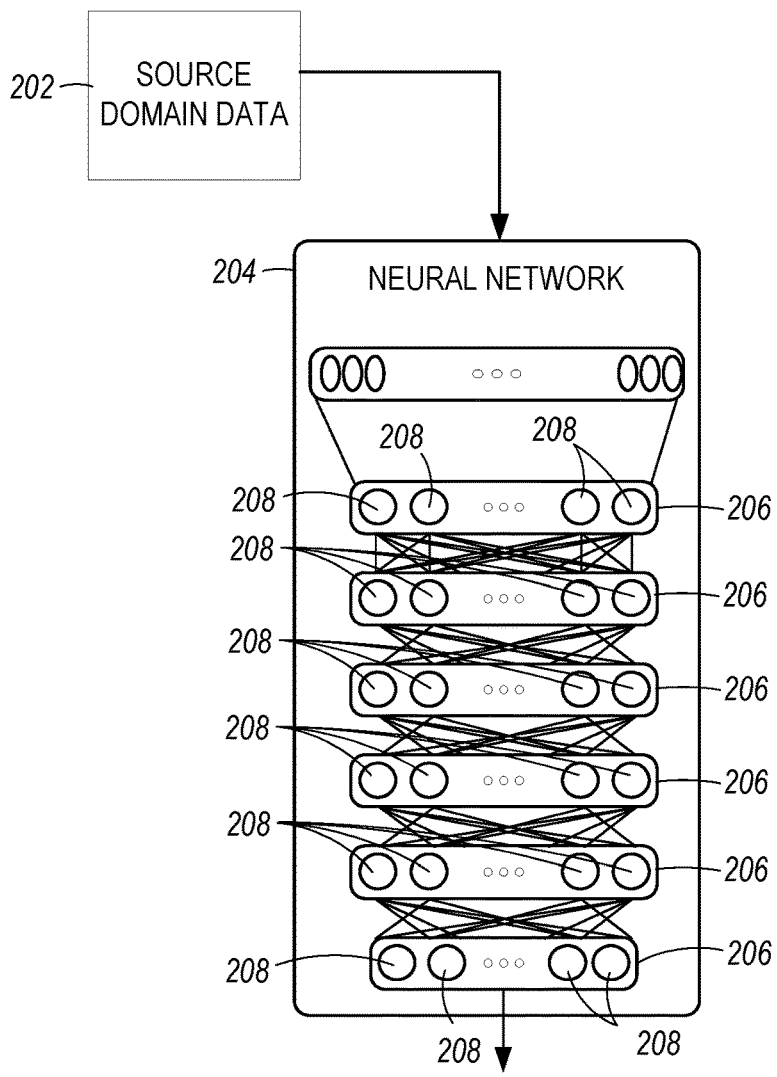
FIG. 2 illustrates an example neural network, in accordance with some embodiments.
Figure 2:
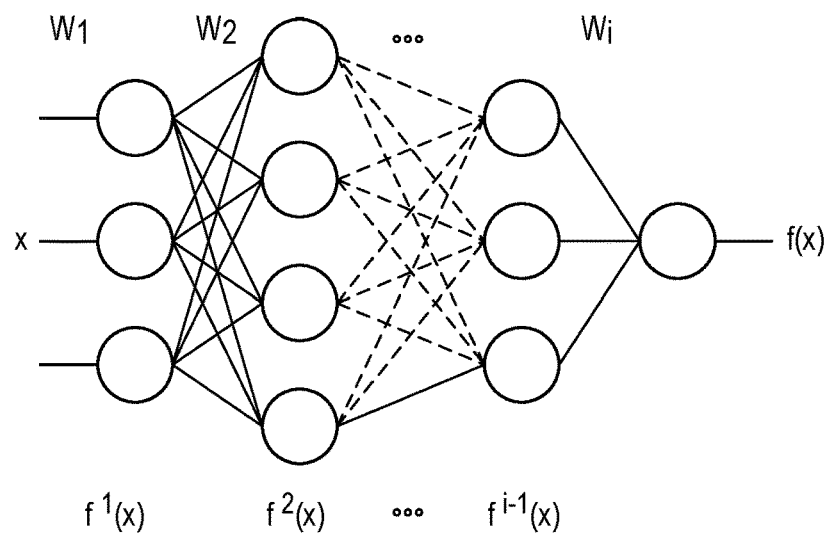

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1$, $W_2$, . . . , $W_i$ are applied to the input to each layer to arrive at $f^1(x)$, $f^2(x)$, . . . , $f^{i-1}(x)$, until finally the output f(x) is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM node serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
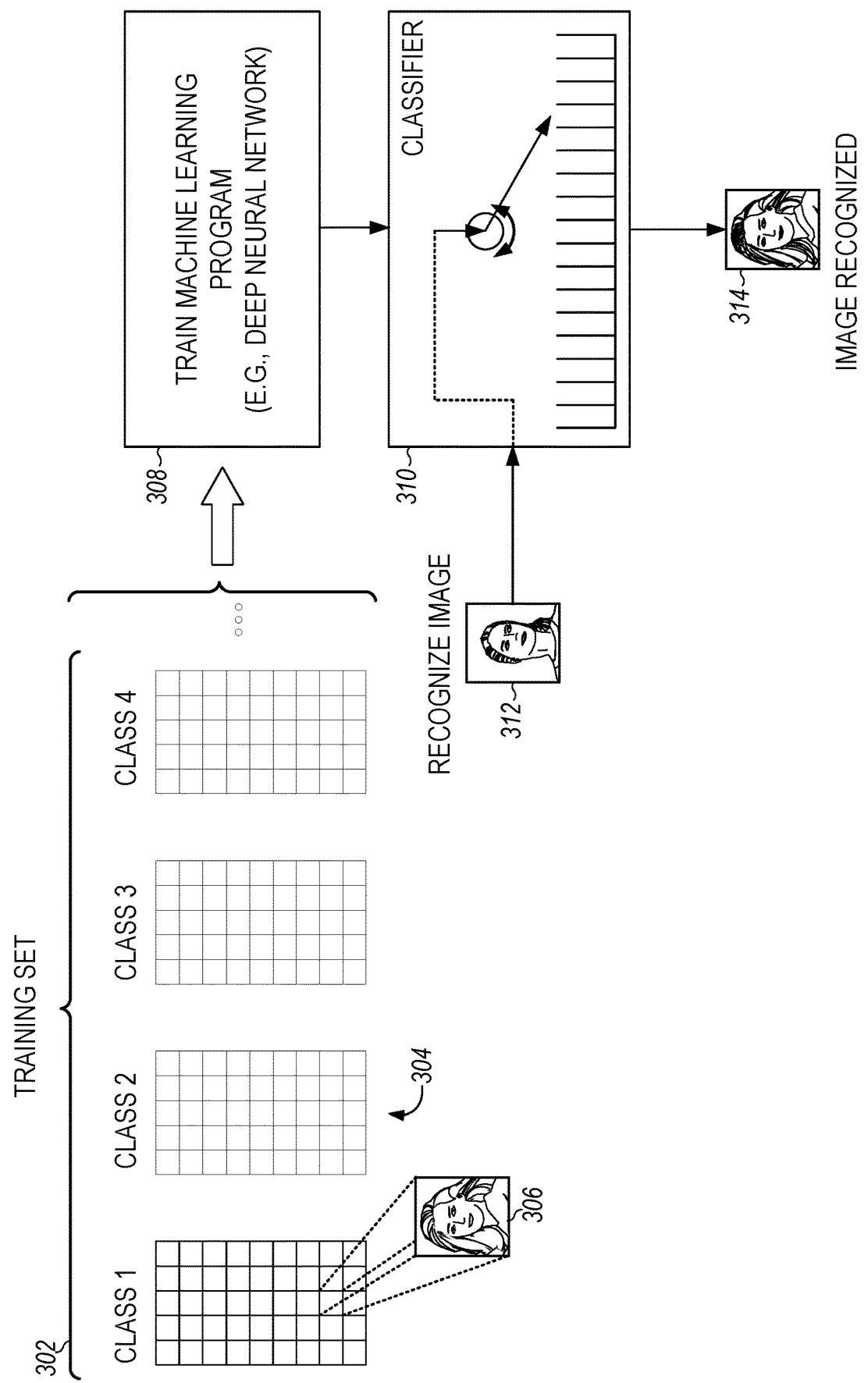
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Barack Obama, one class corresponds to George W. Bush, one class corresponds to Bill Clinton, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
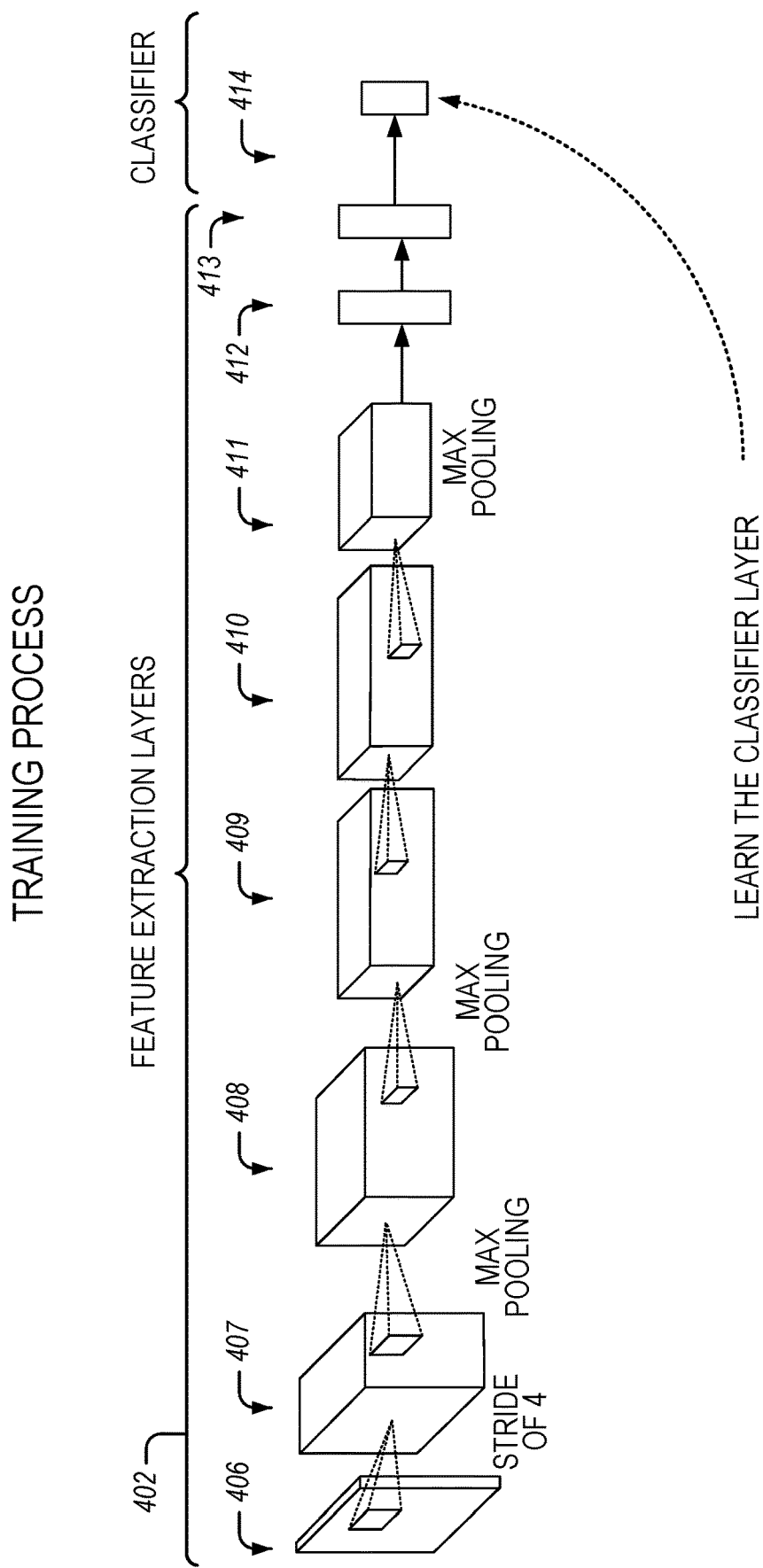
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
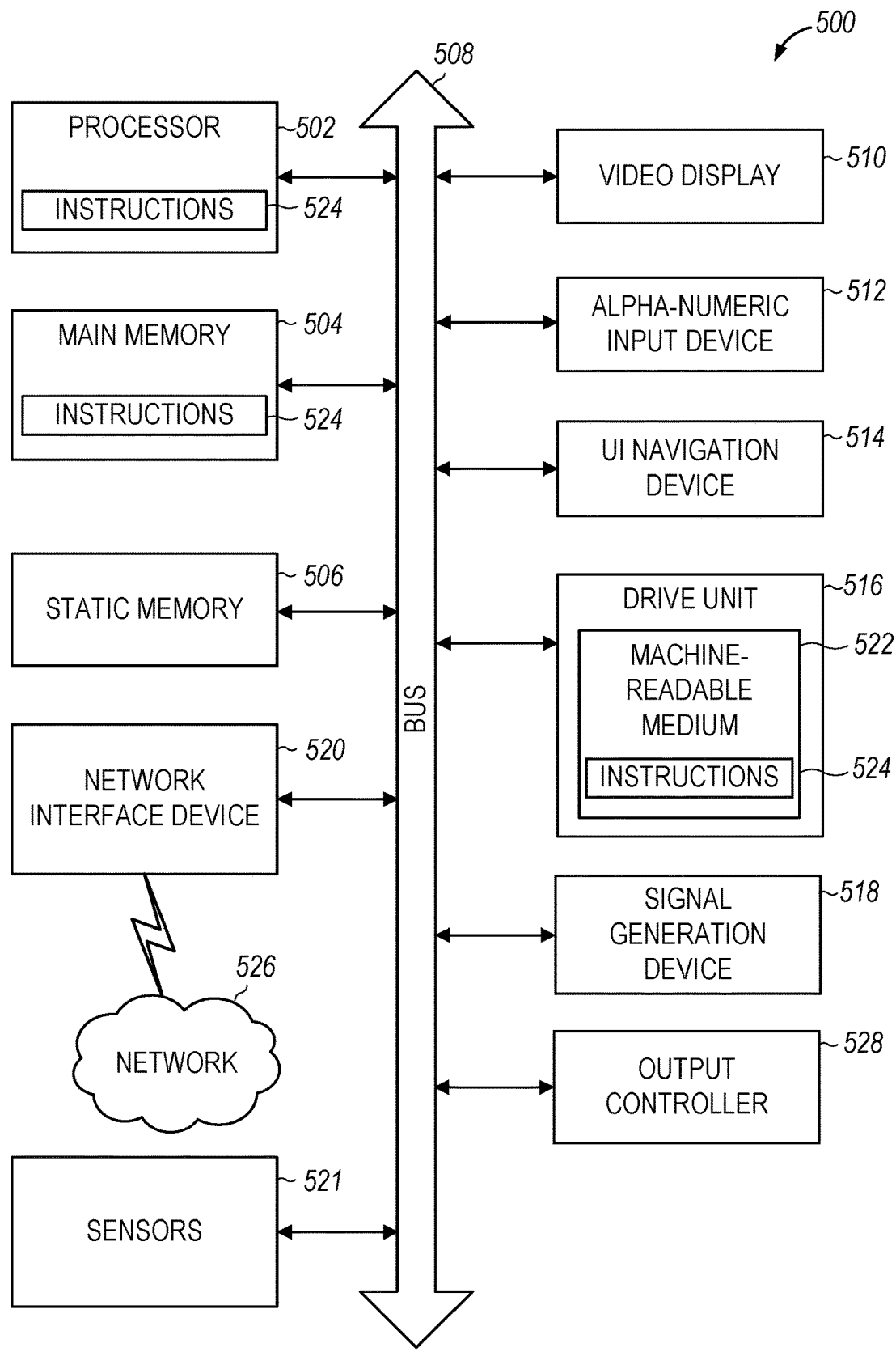
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Reinforcement learning is an area of machine learning concerned with how intelligent agents ought to take actions in an environment in order to maximize the notion of cumulative reward. Reinforcement learning is one of three basic machine learning paradigms, alongside supervised learning and unsupervised learning.

Reinforcement learning differs from supervised learning in not needing labelled input/output pairs be presented, and in not needing sub-optimal actions to be explicitly corrected. Instead, the focus is on finding a balance between exploration (of uncharted territory) and exploitation (of current knowledge). Partially supervised reinforcement learning algorithms can combine the advantages of supervised and reinforcement learning algorithms.

The environment may be stated in the form of a Markov decision process (MDP) because many reinforcement learning algorithms for this context use dynamic programming techniques. One difference between the classical dynamic programming methods and reinforcement learning algorithms is that the latter do not assume knowledge of an exact mathematical model of the MDP and they target large MDPs where exact methods become infeasible. Due to its generality, reinforcement learning is studied in many disciplines, such as game theory, control theory, operations research, information theory, simulation-based optimization, multi-agent systems, swarm intelligence, and statistics.

Figure 6:
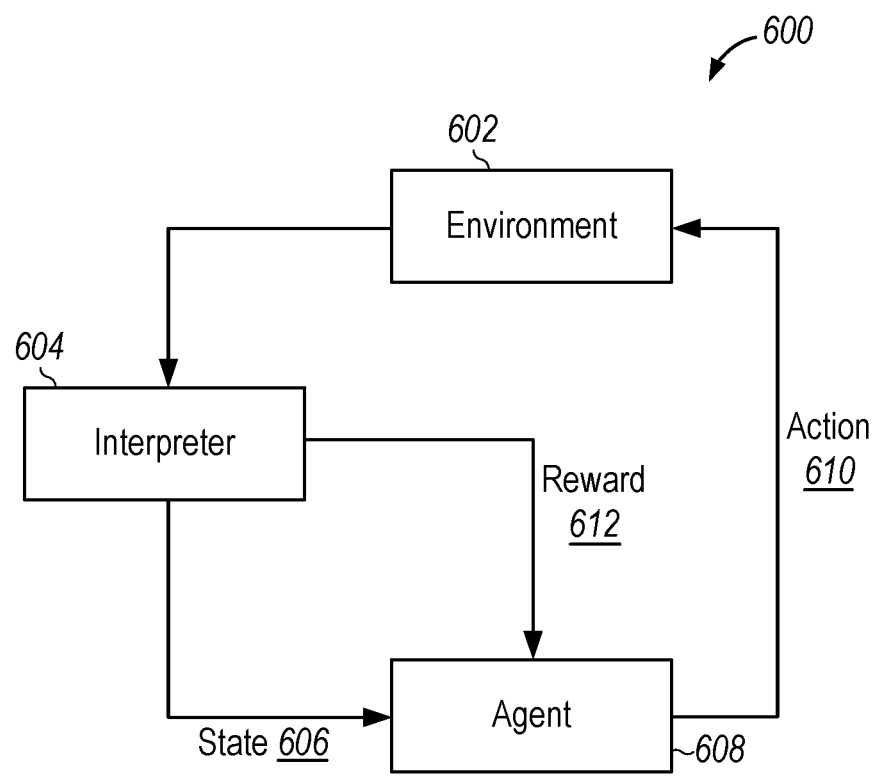
FIG. 6 is a data flow diagram of reinforcement learning, in accordance with some embodiments.

FIG. 6 is a data flow diagram of reinforcement learning 600, in accordance with some embodiments. The reinforcement learning 600 may be implemented using one or more computing machines 500. As shown, reinforcement learning 600 is implemented in an environment 602 (e.g., a chess game). The environment 602 is interpreted by an interpreter 604 (e.g., a component of an electronic chess playing engine) that identifies a state 606 and provides the state 606 to an agent 608 (e.g., an artificial intelligence engine that provides an output). The state 606 may include relevant (e.g., for making a decision) information from the environment 602. The agent 608 computes an action 610 (e.g., a chess move) that makes changes to the environment 602. The changed environment 602 (after the changes are made) is interpreted by the interpreter 604 and a reward 612 is computed and provided to the agent 608. In chess, the reward may be based on a state of the board (e.g., a value of the chess pieces of the electronic chess playing agent and its opponent, whether the electronic chess playing agent won or lost the chess game, or the like).

The reinforcement learning 600 may be useful in contexts outside of playing chess. For example, in electronic marketing, the environment 602 may include information that a business stores (e.g., in its data repositories) about customers or prospects. The interpreter 604 may interpret data in the environment (e.g., whether a customer or prospect selected a link, responded to a message, or made a purchase). The agent 608 may compute the action 610, for example, to send a message to a customer or a prospect using a specified channel (e.g., email or short messaging service (SMS)) at a specified date and time, that impacts the environment 602.

The environment 602 may include data stored in a data repository and/or a memory of a computing machine (e.g., the main memory 504, the static memory 506, and/or the drive unit 516 of the computing machine 500). The interpreter 604 may be implemented using software, hardware, or a combination of software and hardware. The agent 608 may be implemented using software, hardware, or a combination of software and hardware. The environment 602, the interpreter 604, and/or the agent 608 may be implemented at one or more computing machines (e.g., the computing machine 500) using one or more engines, as described herein.

Some implementations relate to, among other things, using reinforcement learning to personalize recommendations. In the online marketing context, a computing machine (e.g., one or more of the computing machines 100) ingests data on customers (e.g., transactions, engagement with application or webpage, product usage, interaction with customer support, engagement with marketing communications (e.g., whether the customer opens or selects links in an email message, uses a coupon received via an instant messaging service, or swipes a push notification), or the like). A reinforcement learning agent (e.g., the agent 608) from a set of reinforcement learning agents uses that data, together with possible actions, to determine a recommendation. For example, a recommendation may be, "Send customer 3867813098 offer template 342 by email next Tuesday at time 8:00 am EST." The computing machine may receive data every threshold time period (e.g., daily) and may use that data to train the agents to continually improve recommendations based on observed results. The training may be done with respect to a target metric that the agent aims to optimize. The target metric may include at least one or a mathematical combination of: net present value, customer lifetime value, profit from offer, conversion, or the like.

"Bias-variance tradeoff" refers to a condition where simpler machine learning models are likely to underfit data and more complex machine learning models are likely to overfit data. For example, a linear regression model with one covariate may underfit data in a complex system, whereas a large fully-connected neural network is likely to overfit data in a simple system. The large fully-connected neural network may latch on to noise and randomness in the data and may generalize poorly to unseen, novel contexts. One aim of machine learning may be to balance bias and variance in models. Whether a model is too simple or too complex may depend on the underlying dynamics being modeled and on the amount of training data. In some cases, a larger set of training data allows for the use of more complex machine learning models without overfitting.

Some implementations relate to a set of reinforcement learning agents used to solve a common problem (e.g., predicting whether a borrower will default on a personal loan based on the borrower's credit score, income, credit card debt amount, mortgage balance, liquid asset balance, personal loan balance, and the interest rate on the personal loan), with the agents having different levels of complexity.

At an initial time, the reinforcement learning agents initially start with no training data, generating pseudo-random predictions (e.g., regarding whether each borrower will or will not default on the personal loan). In the next period (e.g., after several months, after some of the borrowers have defaulted and others have not), some training data starts to be available. However, the training data might not be sufficient to train more complex agents without overfitting, but might be sufficient for simpler agents. After additional periods, more data becomes available (e.g., as a larger number of borrowers open new loans, default on their loans, or fully repay their loans), and the agents are further trained with the additional data using online learning techniques. After multiple online learning sessions, more complex agents may be used without overfitting.

Thus, simpler agents may be used for predictions early in the process (when there is little training data) and more complex agents may be used later in the process (when there is more training data). As a result, the agent that is used for making a prediction (e.g., regarding whether a borrower will default on a personal loan) may be selected based, at least in part, on the amount of training data that is available.

In some cases, the agents may be ordered in a "staircase" from least to most complex. The least complex agent may be used initially, when there is very little training data. As more training data becomes available, the next least complex agent is used, then the next least complex, until finally, after there is much training data, the most complex agent is used.

In another example, different reinforcement agents may be optimized for making predictions for different borrowers. These different agents may be designed differently. The meta-agent may be trained to identify the optimal reinforcement learning agent to predict whether a given borrower will or will not default on the personal loan. For example, one agent might be optimized for making predictions for borrowers who rent their homes and have high credit scores. Another agent may be optimized for making predictions for borrowers who have high mortgage balances and no other debt. The meta-agent may assign each borrower to a reinforcement learning agent that makes a prediction regarding whether the borrower will default on the personal loan.

The above describes a technique to shifting decision power in an ensemble of agents of different model complexity based on how much training data has accumulated. Another way of deciding which agent should make the recommendation is by using a "meta-agent"—an additional reinforcement learning agent which recommends which agent should make the decision. Thus, the "action space" (which represents all possible decisions) of the meta-agent is all the available agents in the ensemble. The meta-agent receives the same information about the context (e.g., everything that is known about the borrower whose personal loan is being evaluated for likelihood of default) as all the other agents, and the meta-agent is trained with respect to the same target metric as the other agents. However, the recommendation of the meta-agent is which agent to use to generate an action, recommendation, or prediction for the input data (e.g., which agent should be used to determine whether a given borrower will default on a given personal loan).

Figure 7:
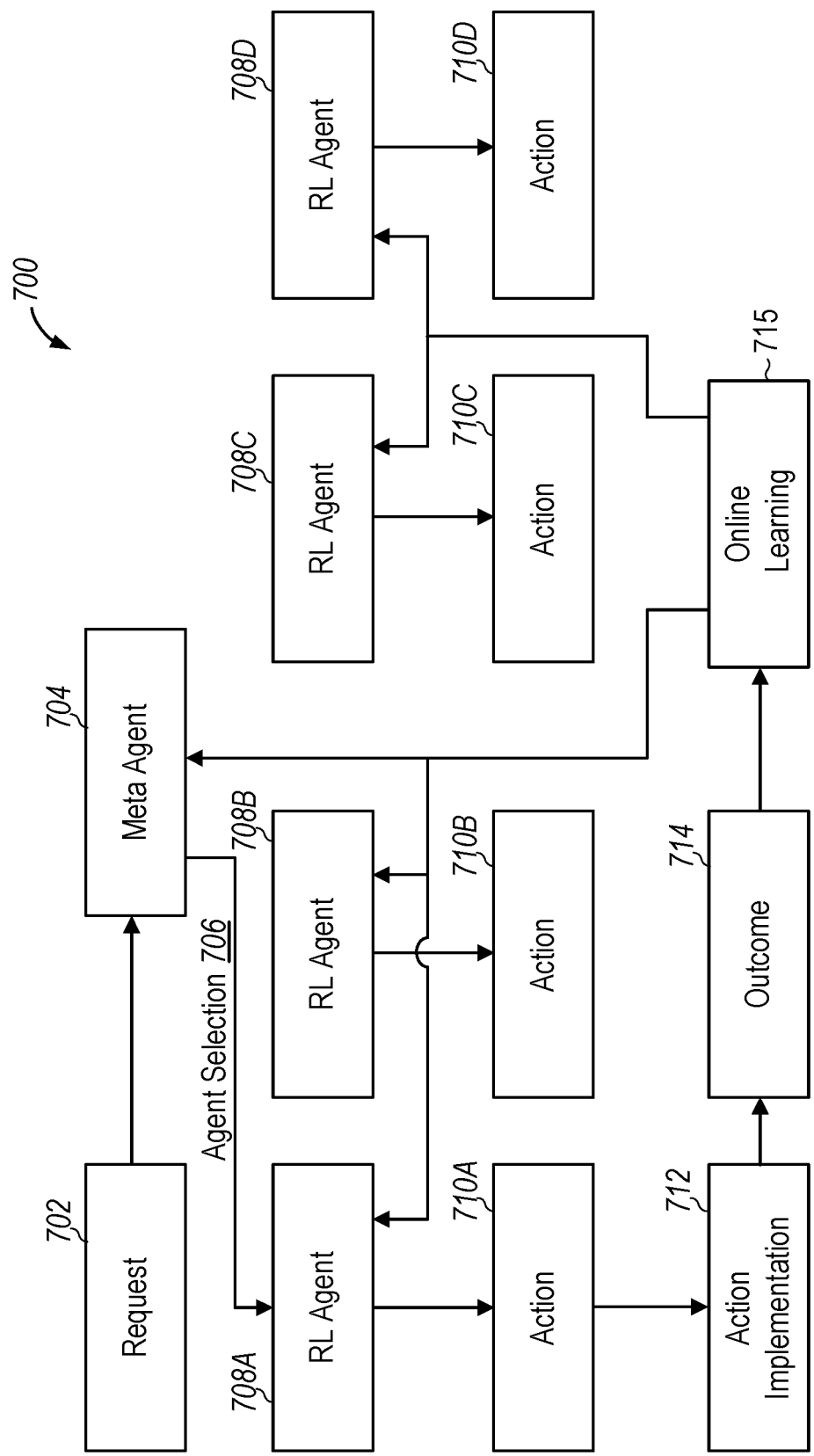
FIG. 7 is data flow diagram of using a meta-agent for reinforcement learning, in accordance with some embodiments.

FIG. 7 is data flow diagram of using a meta-agent for reinforcement learning 700, in accordance with some embodiments. The reinforcement learning 700 may be implemented using one or more computing machines 500. As shown in FIG. 7, a request 702 is provided to a meta-agent 704. The request 702 may be a request to compute an action 610, and may include a state 606 or a previous reward 612. For example, in the online marketing context, the request may be to compute a discount percentage to include in a message to a prospect. In the chess game context, the request may be a request to compute a chess move. The meta-agent 704 makes an agent selection 706 of a reinforcement learning (RL) agent 708A from among multiple reinforcement learning agents 708A, 708B, 708C, 708D to compute the action. As shown, there are four reinforcement learning agents 708A, 708B, 708C, 708D. However, in other implementations, there may be other numbers of reinforcement learning agents. As illustrated, each of the reinforcement learning agents 708A, 708B, 708C, 708D computes an action 710A, 710B, 710C, 710D. In other implementations, some of the reinforcement learning agents 708B, 708C, 708D different from the selected reinforcement learning agent 708A might not compute action(s). The actin 710A computed by the selected reinforcement learning agent 710A is used for action implementation 712. The action implementation 712 results in an outcome 714 being determined, for example, by implementing the action 710A in the real world or simulating implementation of the action using a computerized model. The outcome 714 is used in online learning 716 to further train one or more of the reinforcement learning agents 708A, 708B, 708C, 708D and/or the meta-agent 704.

Figure 8:
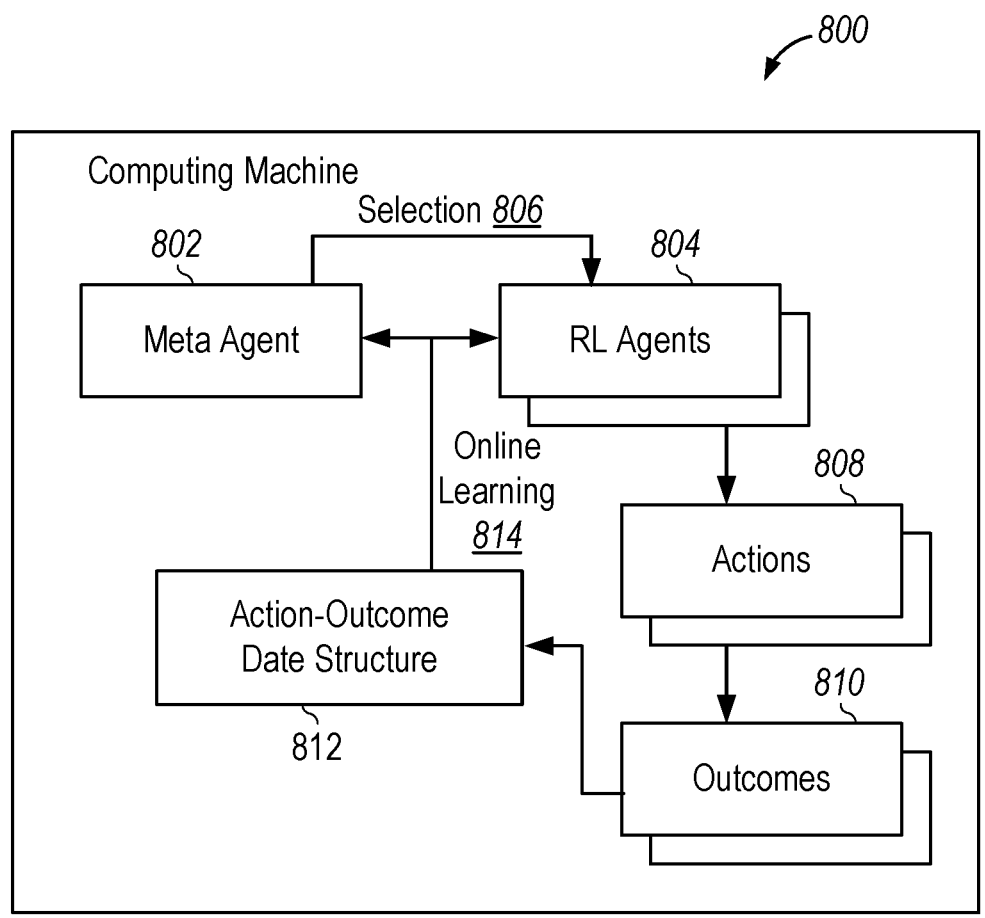
FIG. 8 is a block diagram of a computing machine for using a meta-agent for reinforcement learning, in accordance with some embodiments.

FIG. 8 is a block diagram of a computing machine 800 for using a meta-agent for reinforcement learning, in accordance with some embodiments. The computing machine 800 may include some or all of the components of the computing machine 500. As shown, the computing machine stores a meta-agent 802 and multiple reinforcement learning agents 804. The meta-agent 802 may correspond to the meta-agent 704. The reinforcement learning agents 804 may correspond to the reinforcement learning agents 708A, 708B, 708C, 708D. The meta-agent 802 is a reinforcement learning agent (or, alternatively, another type of artificial intelligence or machine learning agent) which, upon receiving a request to compute an action, makes a selection 806 of one of the reinforcement learning agents 804 to compute the action which is to be implemented or simulated. The selected reinforcement learning agent 804 and, in some cases, one or more other reinforcement learning agents 804 then compute actions 808 in response to the request. Outcomes 810 for one or more of the actions 808 (including the action computed by the selected reinforcement learning agent 804) may be determined (e.g., by implementation or by simulation) and stored in an action-outcome data structure 812. The action-outcome data structure 812 may be a table (or any other type of data structure) that stores actions (e.g., all or a portion of the actions 808 and/or other actions) and associated outcomes (e.g., all or a portion of the outcomes 810 and/or other outcomes). Upon updating the action-outcome data structure 812 with additional outcome(s) 810 of action(s) 808, online learning 814 is used to further train the meta-agent 802 and/or one or more of the reinforcement learning agents 804 based on the additional outcome(s) 810 of the action(s) 808 stored in the action-outcome data structure 812.

In one use case, the computing machine 800 implements a chess playing program using multiple reinforcement learning agents 804 which leverage different approaches to the chess playing task. Before making a chess move in a chess game, the meta-agent 802 selects one of the reinforcement learning agents 804 to determine the move. The move identified by the selected reinforcement learning agent 804 is stored in the actions 808 and an outcome 810 of the move is determined. The outcome 810 may include changes in the state of the chess board after the move, the opponent's move, and changes in the state of the chess board after the opponent's move. The outcome may be stored in the action-outcome data structure 812 for online learning by the meta-agent 802 and/or the reinforcement learning agents 804 during the chess game and after the chess game is completed.

Figure 9:
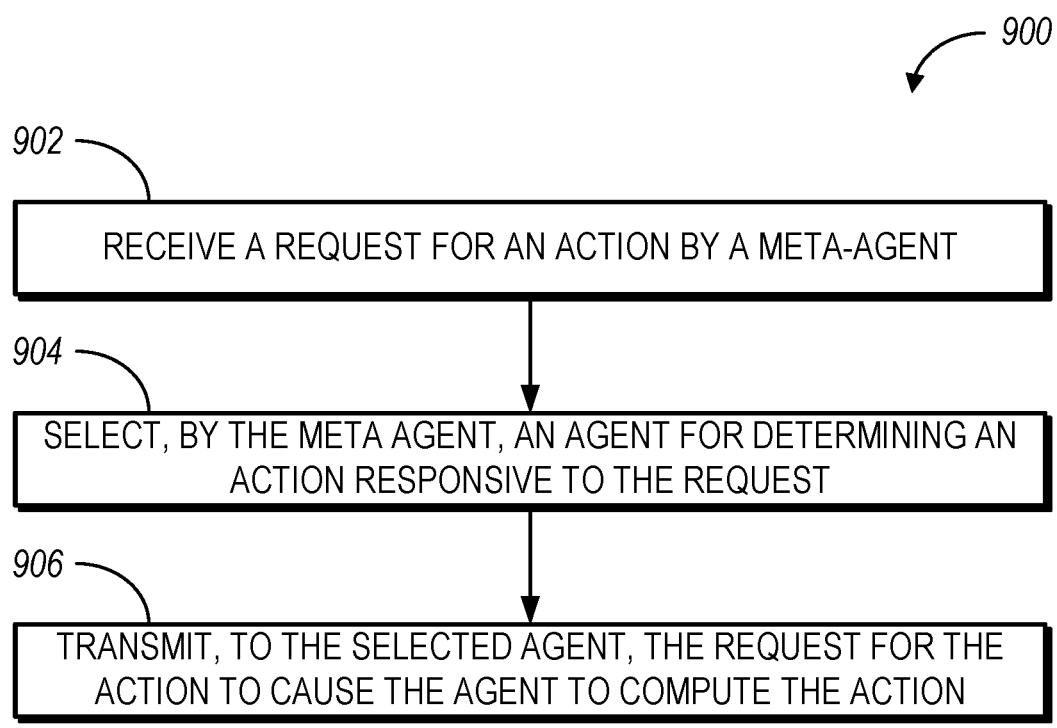
FIG. 9 is a flow chart of a method for computing an action by a meta-agent, in accordance with some embodiments.

FIG. 9 is a flow chart of a method 900 for computing an action by a meta-agent, in accordance with some embodiments. The method 900 may be performed by a computing machine, such as the computing machine 500 or the computing machine 800.

At block 902, a meta-agent (e.g., the meta-agent 704 or the meta-agent 802) at the computing machine receives a request for an action. The request for the action may be provided manually, for example, by a user of a computing machine who wishes to leverage the meta-agent in making a decision. Alternatively, the request may be generated automatically based on a detected state (e.g., when it is the machine's turn to make a move in a game with a machine-implemented player).

At block 904, the meta-agent selects an agent for determining an action responsive to the request. The agent is selected from a plurality of reinforcement learning agents (e.g., the reinforcement learning agents or 708A, 708B, 708C, 708D or the reinforcement learning agents 804). The agent is selected based on values in a dataset associated with the request. At least a portion of the dataset has predefined value types. The meta-agent and each agent from the plurality of reinforcement learning agents is trained using datasets including the predefined value types. In one example, the predefined value types include an initial feature vector. The initial feature vector may have the structure: <value_type_1, value_type_2, . . . value_type_n>. For example, in an online marketing context, the initial feature vector may have the structure: <past purchases, past messages sent, past activity in response to messages>, where past activity in response to messages may include, for example, selecting a link or using a promotional offer. The initial feature vector may have additional values added to itself (for further processing by the meta-agent or by the agents) based on action(s) proposed or implemented by the meta-agent and/or agents from the plurality of reinforcement learning agents. An example technique for training the plurality of reinforcement learning agents is described in conjunction with FIG. 10. In alternative implementations, other training techniques may be used.

At block 906, the meta-agent transmits, to the selected agent, the request for the action to cause the agent to compute the request. The agent then computes the request. The computing machine may perform the action computed by the agent. The computing machine may store, in an action-outcome data structure (e.g., the action-outcome data structure 812), an outcome of performing the action and an identifier of the selected agent. The computing machine may iteratively train the meta-agent and/or at least one of the plurality of reinforcement learning agents using the action-outcome data structure.

In one example, the disclosed technology may be used in an online marketing context. The action may include transmission, to a specified address (e.g., an email address, a telephone number, or a browser or application address for push notifications), of a specified offer (e.g., 5% off at ABC Coffee Shop or free coffee at ABC Coffee Shop with the purchase of a pastry) on a specified day (e.g., Sunday, May 1, or Monday, May 2), at a specified time (e.g., 9:00 AM or 10:00 AM), and via a specified channel (e.g., email, SMS or push notification). The dataset may include stored data about an account associated with the specified address. The data may include at least one of: day, time or channel of past offers provided, responses to the past offers, past purchases, or the like.

Figure 10:
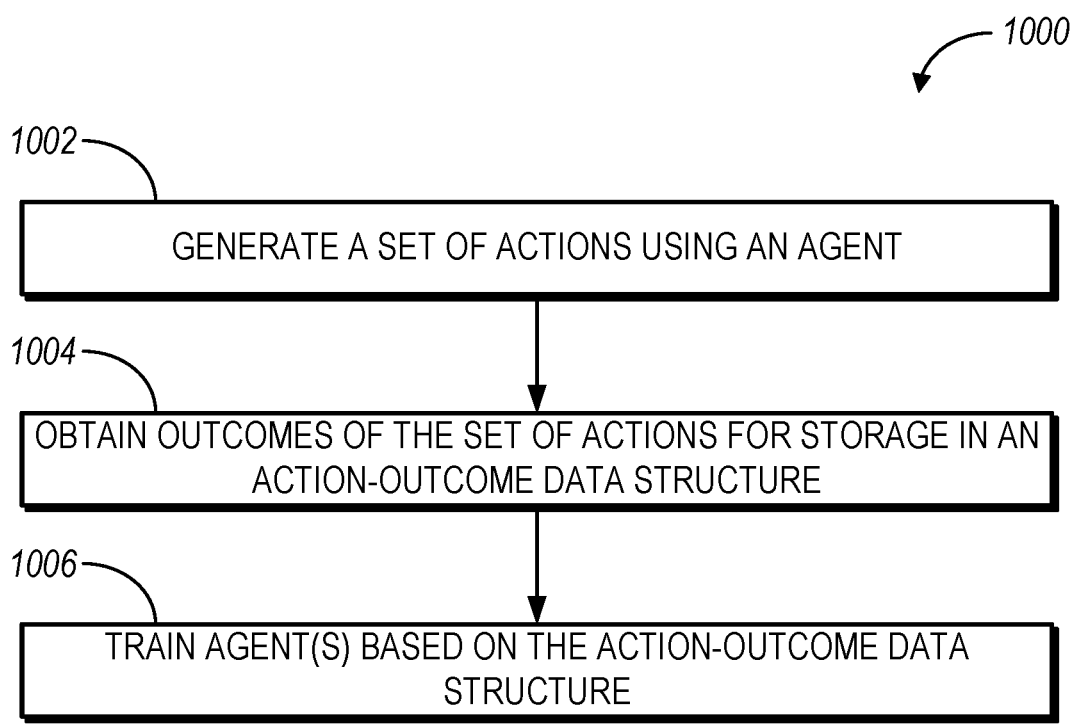
FIG. 10 is a flow chart of a method for training agents(s), in accordance with some embodiments.

FIG. 10 is a flow chart of a method 1000 for training agents(s), in accordance with some embodiments. The method 1000 may be performed by a computing machine, such as the computing machine 500 or the computing machine 800. According to some examples, the reinforcement learning agents 708A, 708B, 708C, 708D and/or the reinforcement learning agents 804 may be trained using the method 1000.

At block 1002, an agent at the computing machine (e.g., the agent selected at block 904 of FIG. 9) generates a set of actions. The agent is a member of a plurality of reinforcement learning agents. In some examples, the agent may include a combination of multiple agent (e.g., in the example of transmitting a message to a customer, a first agent selects a channel, a second agent selects a day, and a third agent selects a time).

At block 1004, the computing machine obtains outcomes of the first set of actions for storage in an action-outcome data structure (e.g., the action-outcome data structure 812). The action-outcome data structure may be any data structure (e.g., an array, a matrix, a table, a list, or the like) for storing actions and the outcomes of the actions. The outcomes may include changes in state or reward(s) based on the actions.

At block 1006, the computing machine trains agent(s) from the plurality of reinforcement learning agents based on the action-outcome data structure. The training may leverage online learning to provide training in real-time after actions are implemented in the real-world. For example, in the context of transmitting offer messages to customers, initially the agents may have no or very little training and may pseudo-randomly select offers (and associated days and times) for transmission to customers. After offers are transmitted, the agents may store data indicating whether the customer viewed, selected, and/or made a purchase using an offer. This information may be used for training the agents during real-world implementation of action(s) generated by the agents.

The operations 1002, 1004, and 1006 may be repeated multiple times until a stopping condition (e.g., a condition indicating that further training is not necessary) is met. The stopping condition may be based on an number of times the operations 1002, 1004, and 1006 have been repeated.

In some implementations, the computing machine receives a user input representing a user-selected agent from the plurality of agents. The computing machine, using the user-selected agent, generates a proposed action. The computing machine obtains an outcome of the proposed action for storage in the action-outcome data structure.

In some implementations, each agent of the plurality of reinforcement learning agents generates proposed actions. The set of actions, generated using the selected agent, is executed. At least a portion of the proposed actions, generated by agents in the plurality of reinforcement agents that are not the selected agent, is not executed. In some cases, all of the actions generated by agents that are not the selected agent are not executed.

Some embodiments are described as numbered examples (Example 1, 2, 3, etc.). These are provided as examples only and do not limit the technology disclosed herein.

Example 1 is a method comprising: receiving a request for an action by a meta-agent; selecting, using the meta-agent, an agent for determining an action responsive to the request, the agent being selected from a plurality of reinforcement learning agents, wherein the agent is selected based on values in a dataset associated with the request, wherein at least a portion of the dataset has predefined value types, wherein the meta-agent and each agent from the plurality of reinforcement learning agents is trained using datasets including the predefined value types; and transmitting, to the selected agent, the request for the action to cause the agent to compute the action.

In Example 2, the subject matter of Example 1 includes, training the plurality of reinforcement learning agents by: generating a first set of actions using the selected agent from the plurality of reinforcement learning agents; obtaining outcomes of the first set of actions for storage in an action-outcome data structure; and repeating until a stopping condition is met: training, based on the action-outcome data structure, at least a subset of agents from the plurality of reinforcement learning agents; generating a current set of actions using a current agent from the plurality of reinforcement learning agents; and obtaining outcomes of the current set of actions for storage in the action-outcome data structure.

In Example 3, the subject matter of Example 2 includes, wherein training the plurality of reinforcement learning agents further comprises: receiving a user input representing a user-selected agent from the plurality of agents; generating a proposed action by the user-selected agent; and obtaining an outcome of the proposed action for storage in the action-outcome data structure, in addition to obtaining outcomes of the first set of actions using the agent selected by the meta-agent.

In Example 4, the subject matter of Examples 2-3 includes, wherein each agent of the plurality of agents generates proposed actions, wherein the first set of actions, generated using the selected agent, is executed, and wherein at least a portion of the proposed actions, generated by agents in the plurality of agents that are not the selected agent, is not executed.

In Example 5, the subject matter of Examples 1-4 includes, performing the action; and storing, in an action-outcome data structure, an outcome of performing the action and an identifier of the selected agent.

In Example 6, the subject matter of Example 5 includes, iteratively training the meta-agent and at least one of the plurality of reinforcement learning agents using the action-outcome data structure.

In Example 7, the subject matter of Examples 1-6 includes, wherein the action comprises a transmission, to a specified address, of a specified offer on a specified day, at a specified time, and via a specified channel.

In Example 8, the subject matter of Example 7 includes, wherein the dataset comprises stored data about an account associated with the specified address.

Example 9 is a non-transitory machine-readable medium storing instructions which, when executed by one or more computing machines, cause the one or more computing machines to perform operations comprising: receiving a request for an action by a meta-agent; selecting, using the meta-agent, an agent for determining an action responsive to the request, the agent being selected from a plurality of reinforcement learning agents, wherein the agent is selected based on values in a dataset associated with the request, wherein at least a portion of the dataset has predefined value types, wherein the meta-agent and each agent from the plurality of reinforcement learning agents is trained using datasets including the predefined value types; and transmitting, to the selected agent, the request for the action to cause the agent to compute the action.

In Example 10, the subject matter of Example 9 includes, the operations further comprising: training the plurality of reinforcement learning agents by: generating a first set of actions using the selected agent from the plurality of reinforcement learning agents; obtaining outcomes of the first set of actions for storage in an action-outcome data structure; and repeating until a stopping condition is met: training, based on the action-outcome data structure, at least a subset of agents from the plurality of reinforcement learning agents; generating a current set of actions using a current agent from the plurality of reinforcement learning agents; and obtaining outcomes of the current set of actions for storage in the action-outcome data structure.

In Example 11, the subject matter of Example 10 includes, wherein training the plurality of reinforcement learning agents further comprises: receiving a user input representing a user-selected agent from the plurality of agents; generating a proposed action by the user-selected agent; and obtaining an outcome of the proposed action for storage in the action-outcome data structure, in addition to obtaining outcomes of the first set of actions using the agent selected by the meta-agent.

In Example 12, the subject matter of Examples 10-11 includes, wherein each agent of the plurality of agents generates proposed actions, wherein the first set of actions, generated using the selected agent, is executed, and wherein at least a portion of the proposed actions, generated by agents in the plurality of agents that are not the selected agent, is not executed.

In Example 13, the subject matter of Examples 9-12 includes, the operations further comprising: performing the action; and storing, in an action-outcome data structure, an outcome of performing the action and an identifier of the selected agent.

In Example 14, the subject matter of Example 13 includes, the operations further comprising: iteratively training the meta-agent and at least one of the plurality of reinforcement learning agents using the action-outcome data structure.

Example 15 is a system comprising: processing circuitry; and a memory storing instructions which, when executed by the processing circuitry, cause the processing circuitry to perform operations comprising: receiving a request for an action by a meta-agent; selecting, using the meta-agent, an agent for determining an action responsive to the request, the agent being selected from a plurality of reinforcement learning agents, wherein the agent is selected based on values in a dataset associated with the request, wherein at least a portion of the dataset has predefined value types, wherein the meta-agent and each agent from the plurality of reinforcement learning agents is trained using datasets including the predefined value types; and transmitting, to the selected agent, the request for the action to cause the agent to compute the action.

In Example 16, the subject matter of Example 15 includes, the operations further comprising: training the plurality of reinforcement learning agents by: generating a first set of actions using the selected agent from the plurality of reinforcement learning agents; obtaining outcomes of the first set of actions for storage in an action-outcome data structure; and repeating until a stopping condition is met: training, based on the action-outcome data structure, at least a subset of agents from the plurality of reinforcement learning agents; generating a current set of actions using a current agent from the plurality of reinforcement learning agents; and obtaining outcomes of the current set of actions for storage in the action-outcome data structure.

In Example 17, the subject matter of Example 16 includes, wherein training the plurality of reinforcement learning agents further comprises: receiving a user input representing a user-selected agent from the plurality of agents; generating a proposed action by the user-selected agent; and obtaining an outcome of the proposed action for storage in the action-outcome data structure, in addition to obtaining outcomes of the first set of actions using the agent selected by the meta-agent.

In Example 18, the subject matter of Examples 16-17 includes, wherein each agent of the plurality of agents generates proposed actions, wherein the first set of actions, generated using the selected agent, is executed, and wherein at least a portion of the proposed actions, generated by agents in the plurality of agents that are not the selected agent, is not executed.

In Example 19, the subject matter of Examples 15-18 includes, the operations further comprising: performing the action; and storing, in an action-outcome data structure, an outcome of performing the action and an identifier of the selected agent.

In Example 20, the subject matter of Example 19 includes, the operations further comprising: iteratively training the meta-agent and at least one of the plurality of reinforcement learning agents using the action-outcome data structure.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving a request for an action by a meta-agent;
selecting, using the meta-agent, an agent for determining an action responsive to the request, the agent being selected from a plurality of reinforcement learning agents, wherein the agent is selected based on values in a dataset associated with the request, wherein at least a portion of the dataset has predefined value types, wherein the meta-agent and each agent from the plurality of reinforcement learning agents is trained using datasets including the predefined value types;
transmitting, to the selected agent, the request for the action to cause the agent to compute the action; and
training the plurality of reinforcement learning agents by:
generating a first set of actions using the selected agent from the plurality of reinforcement learning agents;
obtaining outcomes of the first set of actions for storage in an action-outcome data structure;
repeating until a stopping condition is met:
training, based on the action-outcome data structure, at least a subset of agents from the plurality of reinforcement learning agents,
generating a current set of actions using a current agent from the plurality of reinforcement learning agents, and
obtaining outcomes of the current set of actions for storage in the action-outcome data structure;
receiving a user input representing a user-selected agent from the plurality of agents;
generating a proposed action by the user-selected agent; and
obtaining an outcome of the proposed action for storage in the action-outcome data structure, in addition to obtaining outcomes of the first set of actions using the agent selected by the meta-agent.

2. The method of claim 1, wherein each agent of the plurality of agents generates proposed actions, wherein the first set of actions, generated using the selected agent, is executed, and wherein at least a portion of the proposed actions, generated by agents in the plurality of agents that are not the selected agent, is not executed.

3. The method of claim 1, further comprising:
performing the action; and
storing, in an action-outcome data structure, an outcome of performing the action and an identifier of the selected agent.

4. The method of claim 3, further comprising:
iteratively training the meta-agent and at least one of the plurality of reinforcement learning agents using the action-outcome data structure.

5. The method of claim 1, wherein the action comprises a transmission, to a specified address, of a specified offer on a specified day, at a specified time, and via a specified channel.

6. The method of claim 5, wherein the dataset comprises stored data about an account associated with the specified address.

7. A non-transitory machine-readable medium storing instructions which, when executed by one or more computing machines, cause the one or more computing machines to perform operations comprising:
receiving a request for an action by a meta-agent;
selecting, using the meta-agent, an agent for determining an action responsive to the request, the agent being selected from a plurality of reinforcement learning agents, wherein the agent is selected based on values in a dataset associated with the request, wherein at least a portion of the dataset has predefined value types, wherein the meta-agent and each agent from the plurality of reinforcement learning agents is trained using datasets including the predefined value types;
transmitting, to the selected agent, the request for the action to cause the agent to compute the action; and
training the plurality of reinforcement learning agents by:
generating a first set of actions using the selected agent from the plurality of reinforcement learning agents;
obtaining outcomes of the first set of actions for storage in an action-outcome data structure;
repeating until a stopping condition is met:
training, based on the action-outcome data structure, at least a subset of agents from the plurality of reinforcement learning agents,
generating a current set of actions using a current agent from the plurality of reinforcement learning agents, and
obtaining outcomes of the current set of actions for storage in the action-outcome data structure;
receiving a user input representing a user-selected agent from the plurality of agents;
generating a proposed action by the user-selected agent; and
obtaining an outcome of the proposed action for storage in the action-outcome data structure, in addition to obtaining outcomes of the first set of actions using the agent selected by the meta-agent.

8. The machine-readable medium of claim 7, wherein each agent of the plurality of agents generates proposed actions, wherein the first set of actions, generated using the selected agent, is executed, and wherein at least a portion of the proposed actions, generated by agents in the plurality of agents that are not the selected agent, is not executed.

9. The machine-readable medium of claim 7, the operations further comprising:
performing the action; and
storing, in an action-outcome data structure, an outcome of performing the action and an identifier of the selected agent.

10. The machine-readable medium of claim 9, the operations further comprising:
iteratively training the meta-agent and at least one of the plurality of reinforcement learning agents using the action-outcome data structure.

11. A system comprising:
processing circuitry; and
a memory storing instructions which, when executed by the processing circuitry, cause the processing circuitry to perform operations comprising:
receiving a request for an action by a meta-agent;
selecting, using the meta-agent, an agent for determining an action responsive to the request, the agent being selected from a plurality of reinforcement learning agents, wherein the agent is selected based on values in a dataset associated with the request, wherein at least a portion of the dataset has predefined value types, wherein the meta-agent and each agent from the plurality of reinforcement learning agents is trained using datasets including the predefined value types;
transmitting, to the selected agent, the request for the action to cause the agent to compute the action; and
training the plurality of reinforcement learning agents by:
generating a first set of actions using the selected agent from the plurality of reinforcement learning agents;
obtaining outcomes of the first set of actions for storage in an action-outcome data structure;
repeating until a stopping condition is met:
training, based on the action-outcome data structure, at least a subset of agents from the plurality of reinforcement learning agents,
generating a current set of actions using a current agent from the plurality of reinforcement learning agents, and
obtaining outcomes of the current set of actions for storage in the action-outcome data structure;
receiving a user input representing a user-selected agent from the plurality of agents;
generating a proposed action by the user-selected agent; and
obtaining an outcome of the proposed action for storage in the action-outcome data structure, in addition to obtaining outcomes of the first set of actions using the agent selected by the meta-agent.

12. The system of claim 11, wherein each agent of the plurality of agents generates proposed actions, wherein the first set of actions, generated using the selected agent, is executed, and wherein at least a portion of the proposed actions, generated by agents in the plurality of agents that are not the selected agent, is not executed.

13. The system of claim 11, the operations further comprising:
performing the action; and
storing, in an action-outcome data structure, an outcome of performing the action and an identifier of the selected agent.

14. The system of claim 13, the operations further comprising:
   iteratively training the meta-agent and at least one of the plurality of reinforcement learning agents using the action-outcome data structure.

* * * * *